A. Staudinger,

Fly Trap.

No. 96,050. Patented Oct. 19, 1869.

Witnesses:
William W. Herthel
Robert Burns.

Inventor:
A. Staudinger by his Atty
Herthel

United States Patent Office.

AUGUST STAUDINGER, OF ST. LOUIS, MISSOURI.

Letters Patent No. 96,050, dated October 19, 1869.

IMPROVED FLY-TRAP.

The Schedule referred to in these Letters Patent and making part of the same.

*To all whom it may concern:*

Be it known that I, AUGUST STAUDINGER, of St. Louis, in the county of St. Louis, and State of Missouri, have made certain new and useful Improvements in Traps for Flies and similar insects; and I do hereby declare the following to be a full and true description thereof, reference being had to the accompanying drawings, and to the letters of reference marked thereon.

This invention relates to trap-devices for caging and retaining flies and similar insects, and the nature thereof is in the arrangement of a box-frame with a glass top and receiving-channel or gutter, so that the insect shall enter below, and, in seeking an exit, shall be thrown into said gutter, to be retained by the fluid therein, and by the conformation of said gutter and its inner walls, as will herein more fully appear.

Figure 1:
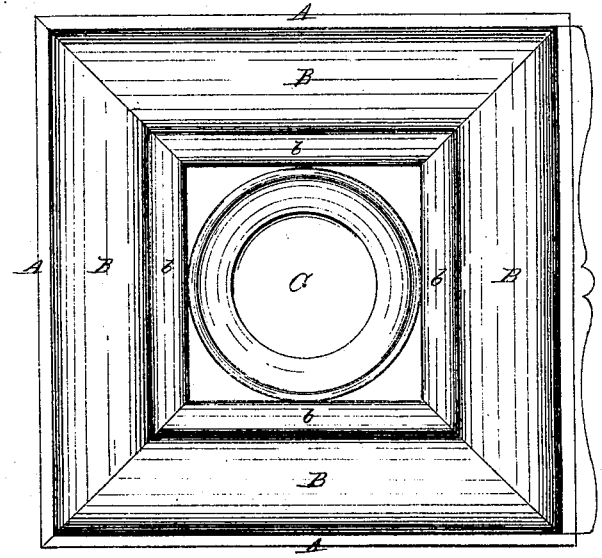
Figure 2:
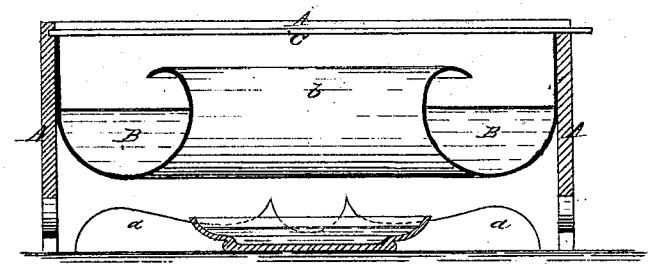

To enable those herein skilled to make and use my said invention, I will now more fully describe the same, referring to the accompanying drawing, Figure 1, as a plan view, and to Figure 2 as a transverse sectional elevation of my trap in one of its usual forms.

I construct a box-frame, A, consisting more usually of four vertical wooden side pieces, with the lower edge curved to leave an opening, $a$, through which the insects may readily pass.

Within said frame, I arrange thereon a gutter, B, the inner walls whereof curve to a return, as at $b$. Said gutter is continuous, following the outline of the frame A.

Over the gutter, I place a pane of glass, or other transparent or nearly transparent substance, C, said pane being arranged in a groove of the frame, so as to be readily withdrawn.

When my said trap is to be used, a saucer or other receptacle, containing sugar, molasses, or other enticement for flies and insects, w ll be placed under the trap. The gutter B will be partly filled with water or other fluid, such as vinegar. Said fluid may be medicated to destroy by poison, or simply to drown the insect. The trap being placed in some locality where flies or other insects accumulate, the insects will fly or creep to the saucer, and, thereupon, in endeavoring to escape, the same will fly upwardly toward the glass, C, it being the nature of such insects to seek the light, and will be precipitated to the trough B. The escape out of said trough is effectually cut off by the return curve of the inner wall thereof, so that the detention and destruction of the insect are made certain. By removing the glass, C, the trough B may readily be cleansed, and thereupon the trap be arranged for use as before.

Having thus fully described my invention,

What I claim, is—

The trap, formed of the wooden frame A, metal trough B, with its walls curved to a return at $b$, and a glass cover arranged to slide in or out, substantially as set forth.

AUGUST STAUDINGER.

Witnesses:
   GEO. P. HERTHEL, Jr.,
   WILLIAM W. HERTHEL.